Sept. 12, 1939.   E. KOPPL   2,172,762
REAMER CONSTRUCTION
Filed Oct. 30, 1937   2 Sheets-Sheet 1
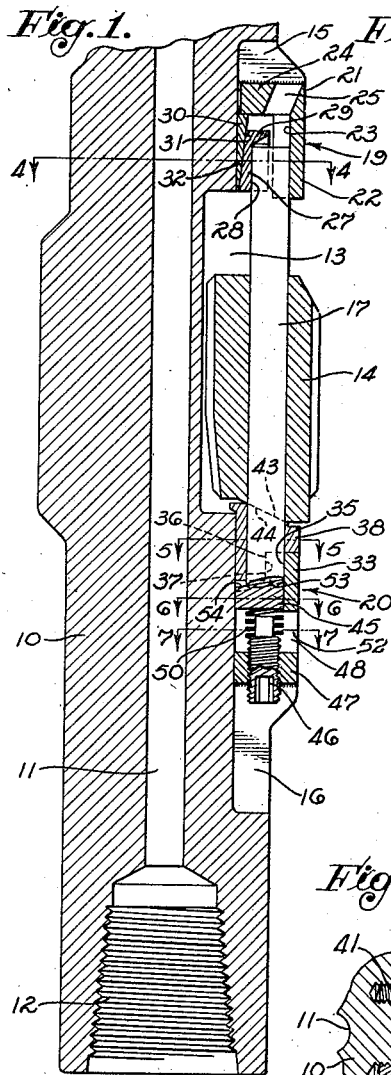
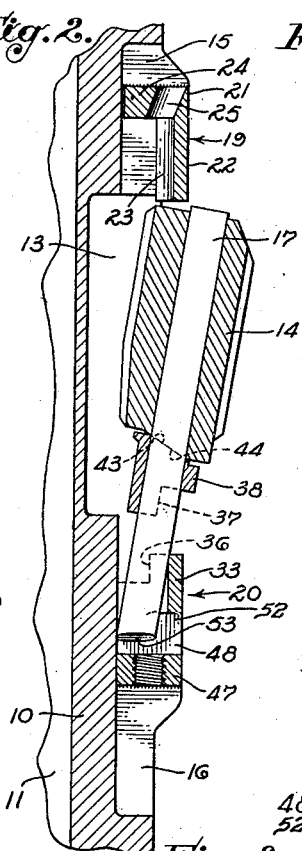
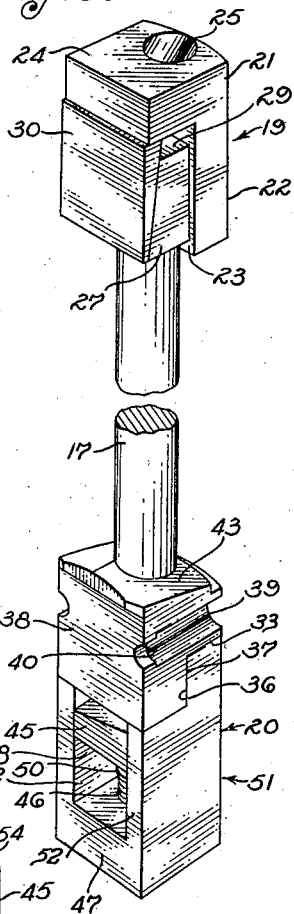
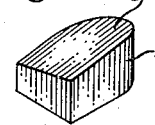
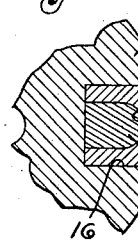
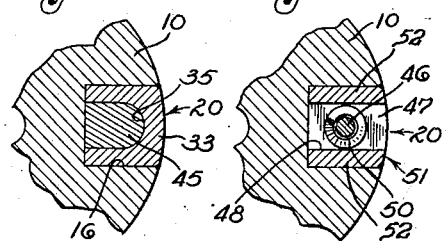
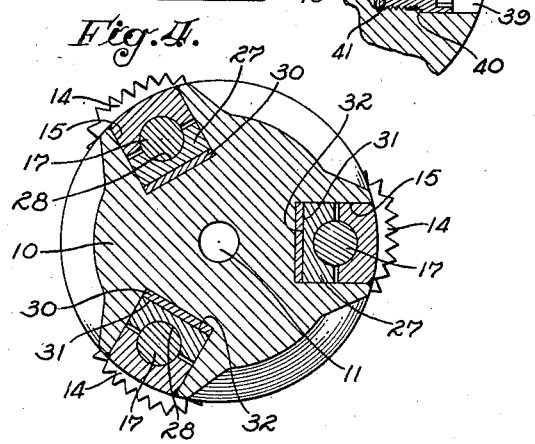
INVENTOR
ERNEST KOPPL
BY HARRIS, KIECH, FOSTER & HARRIS
ATTORNEYS.

Sept. 12, 1939.   E. KOPPL   2,172,762
REAMER CONSTRUCTION
Filed Oct. 30, 1937   2 Sheets-Sheet 2
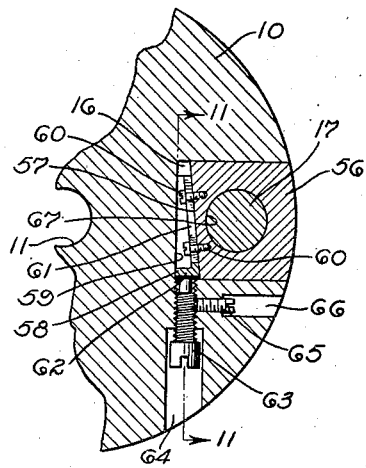
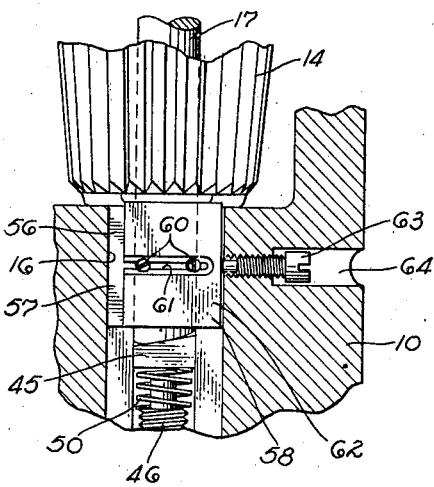
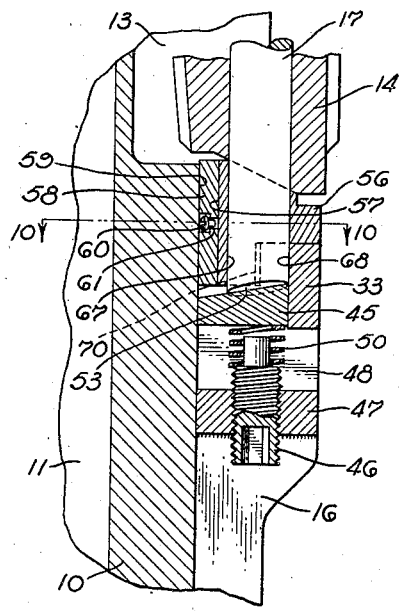
INVENTOR
ERNEST KOPPL
BY HARRIS, KIECH, FOSTER & HARRIS
ATTORNEYS.

Patented Sept. 12, 1939

2,172,762

UNITED STATES PATENT OFFICE 2,172,762

REAMER CONSTRUCTION

Ernest Koppl, Huntington Beach, Calif., assignor to Patco, Inc., Los Angeles, Calif., a corporation of California Application October 30, 1937, Serial No. 171,930

15 Claims. (Cl. 255—73)

My invention relates to bearings for shafts and the like, and is particularly directed to a form of bearings suitable for the roller shaft of a reamer employed in the well drilling art, although it is to be understood that the principles of the invention are applicable to bearings for other purposes in other arts.

In the type of reamer to which my invention is particularly applicable, a plurality of reamer rollers are mounted on shafts that are journaled in bearing means carried by the reamer body. In the usual reamer construction, the bearings for the shaft include parts integral with the reamer body so that wear occasioned by rotation of the shaft has a direct detrimental effect on the reamer body. One object of my invention is to provide a bearing construction in which the parts subject to wear are separable and removable from the reamer body for replacement as required, the reamer body itself being free from such wear.

In the shop assembly of a reamer, carelessness, irregularities in contacting surfaces, or foreign particles between adjacent surfaces often result in failure to tighten the bearings properly. Once such an improperly assembled reamer is in operation, the severe stresses of operation soon develop the latent looseness of the bearings with devastating wearing effect. One object of my invention is to provide a bearing construction that will automatically carry out any additional tightening required when the bearing is subject to operating conditions to prevent such development of latent looseness.

Another object of my invention is to effect a bearing construction that will automatically take up wear as required for close fitting, and, further, take up the wear in a direction to maintain the gauge of the reamer.

A further object of my invention is to provide a self-tightening bearing for a roller shaft whereby the relative movement, and therefore the wear, will be for the most part between the roller and the shaft rather than between the shaft and its bearing.

A more specific object of my invention is to provide a bearing for a shaft that tightens against the shaft in response to longitudinal movement of the shaft, and to arrange the shaft to move longitudinally when rotated from an assembled position.

The above and other objects and advantages of my invention will be made clear in the ensuing detailed description, taken with the accompanying drawings, in which:

Fig. 1 is an axial section through a reamer and a bearing of the reamer as constructed in accordance with my invention;

Fig. 2 is a fragmentary view similar to Fig. 1 indicating how a roller shaft may be removed from or mounted in the bearing;

Fig. 3 is a perspective view of parts entering into the bearing construction;

Fig. 4 is a transverse section taken as indicated by the line 4—4 of Fig. 1;

Fig. 5 is a transverse section of a portion of the device taken as indicated by the line 5—5 of Fig. 1;

Fig. 6 is a view similar to Fig. 5 taken as indicated by the line 6—6 of Fig. 1;

Fig. 7 is a similar view taken as indicated by the line 7—7 of Fig. 1;

Fig. 8 is a perspective view of a removable spacer employed in the preferred form of my combination;

Fig. 9 is a fragmentary section similar to Fig. 1 showing a modification of the bearing at the lower end of the roller shaft;

Fig. 10 is a transverse section taken as indicated by the line 10—10 of Fig. 9; and Fig. 11 is a longitudinal section taken as indicated by line 11—11 of Fig. 10.

Fig. 1 shows a reamer body 10 having an axial mud passage 11 therethrough and threads 12 for connection with a drill pipe or similar means, the threads at the upper end of the body not being shown. Disposed around the periphery of the body 10 are longitudinal recesses 13 to accommodate reamer rollers 14, and associated longitudinal recesses 15 and 16 to accommodate bearing means for the upper and lower ends respectively of the shafts or spindles 17 on which the rollers 14 are rotatably mounted. The rollers 14 are eccentric in shape, or flattened on one side, as taught by my Patent No. 2,033,638, so that the rollers may be retracted by rotation to clear the well tubing.

For each roller 14, there is mounted in upper and lower bearing recesses 15 and 16 fixed outer bearing means 19 and 20 respectively spaced apart to retain opposite ends of the roller shaft 17. The upper bearing means 19 may comprise an angular block 21 welded to the walls of the recess 15, the vertical portion 22 of the block having an inwardly presented arcuate bearing surface 23, and the horizontal portion 24 of the block having a suitable aperture 25 to receive a tool for exerting force against the upper end of the roller shaft 17.

A removable inner bearing member 27 cooperates with the outer bearing means 19 to retain the upper end of the roller shaft 17, the inner bearing member being spaced from the outer bearing means to allow for wear. In effect, the outer bearing means 19 and the inner bearing member 27 together comprise a split journal box that is contractible to fit the roller shaft 17. In accordance with my conception, this journal box is arranged to be contracted by means operated by rotation of the roller shaft 17. In the preferred form of my invention, I provide cam means to move the shaft axially when rotated, and arrange the split journal box to contract in response to such axial movement of the roller shaft 17. For this purpose I may arrange the inner bearing member 27 to be moved longitudinally by the shaft and provide means to wedge the inner bearing member 27 against the shaft in the course of such longitudinal movement. Thus, I may form the inner bearing member 27 as a bearing shoe having an arcuate bearing surface 28 and a flange 29 overhanging and engaging the upper end of the shaft 17. To achieve the desired wedging action, I may provide a removable wedge 30 having an inclined face 31 to cooperate with the back surface 32 of the bearing shoe 27.

The lower of the two outer fixed bearing means, designated by the numeral 20, may be provided by a wall 33 U-shaped in cross-section and extending across the recess 16, the wall providing a semi-cylindrical bearing surface 35. Preferably, the wall 33 will be cut away at its upper end to provide inwardly directed shoulders 36 to engage complementary outwardly directed shoulders 37 of a cooperating inner bearing member 38. The inner bearing member 38 completely embraces the shaft 17 above the fixed outer bearing member 20. Preferably, a pair of bores 39, formed partly in opposite sides of the inner bearing member 38 and partly in the reamer body 10, are provided for anchoring the bearing member 38 to the reamer body, the bores providing annular shoulders 40 for engagement by suitable socket-head screws 41, as shown in Fig. 5. As taught by my patent heretofore mentioned, I may form the bearing member 38 with an upper inclined face 43 to cooperate with a complementary inclined face 44 at the lower end of the roller 14 for the purpose of rotating the roller to retracted position when the reamer is to pass through well tubing.

To restrict the roller shaft 17 axially when it is assembled to the reamer body, I provide spacer means at the lower end of the shaft, including a spacer block 45 and a socket-head set-screw 46 that is mounted in a lateral wall member 47, the wall member being spaced from the lower end of the bearing means 20 to provide an opening 48 for the insertion and removal of the spacer block. Preferably, the screw 46 has it inner end reduced in diameter to retain a suitable coil spring 50 acting between the screw and the spacer block 45 to provide a desirable yieldable relationship and to prevent the screw from working loose.

For convenience in manufacture, I prefer to form the lower bearing means 20 or wall 33 and the lateral wall 47 in one piece or block as shown at 51 in Fig. 3. The block 51 is welded into place in the lower bearing recess 16, the block providing two spaced side walls 52 that line the recess and connect the wall 33 with the wall 47.

To provide the desired axial movement of the shaft upward against the bearing shoe 27 when the shaft is rotated, I arrange for a cam action involving an inclined surface on the shaft cooperative with some non-rotating means. For example, in the preferred embodiment of my invention I simply form the lower end of the shaft 17 with an inclined face 53 and shape the spacer block 45 with a complementary inclined face 54. When the parts are assembled with the two inclined faces 53 and 54 abutting each other in a common plane, any rotation of the shaft 17 in either direction of rotation will cause the shaft to shift axially upward by a cam action.

The manner in which my combination is assembled, after the blocks 21 and 51 have been welded into place, will be readily understood from the foregoing description. First, the roller 14 and the lower bearing member 38 are assembled on the shaft 17, and then shifted upward on the shaft to permit insertion of the shaft into the lower recess 16 sufficiently for the upper end of the shaft to clear the lower end of the upper bearing means 19, as shown in Fig. 2. The wedge 30 and the bearing shoe 27 are then inserted at their proper positions and the upper end of the shaft 17 is then moved upward into engagement with the bearing shoe 27 and the fixed outer bearing means 19 in the position shown in Fig. 1. The shaft 17 is held in this elevated position while the spacer block 45 is moved through the opening 48 and upward against the bottom of the shaft. At this point the lower bearing member may be moved downward into its normal assembled position. Finally, the set-screw 46 and the spring 50 are adjusted with the tightness required to hold the shaft against downward movement.

When the reamer is put into operation, each of the rollers 14 tends to rotate its associated shaft 17, not only because of the radial load exerted through the rollers, but also because mud working into the annular space between the roller and the shaft tends to increase the frictional engagement of the roller with the shaft. The rotational force transmitted to the roller shaft 17 is so strong that any insufficiency of tightness provided by the shaft assembly of the reamer is immediately remedied in an automatic manner. After the tightening of the assembly by initial operation, wear developing in the course of further operation of the reamer affecting either the bearing shoe 27 or the fixed bearing means 19 will be compensated automatically by rotation of the shaft 17 forcing the bearing shoe 27 upwardly along inclined face 31 of the wedge 32.

A feature of my invention is that rotation of the roller shaft 17 has substantially no share in the wear of associated parts, since such rotation is limited to the extent required to tighten the bearing as described.

It will be noted that the load borne by the roller 14 in operation is directed toward the center of the reamer body 10 and is received only by members separable from the body and readily replaceable, namely, the bearing shoe 27, the wedge 32, and the lower bearing member 38. Since the spacer block 45, the set-screw 46, and the spring 50 are also replaceable, the only permanent parts subject to wear are the outer bearing means 19 and 28. These latter means are to be regarded as only semi-permanent, however, because the upper block 21 and the lower block 51 may readily be removed and replaced by employing a welding torch. If a greater convenience in replacing is desired, the blocks 21 and 51 may be simply keyed to the reamer body. Such replacement is seldom necessary, however, because stresses to cause wear are predominately inward.

A further feature of my invention is that in compensating for wear at the upper end of the shaft 17, the automatic movement is radially outward so that the shaft is continuously held against the outer bearing member 19, thereby holding the associated reamer roller 14 to gauge.

The dismantling of the bearing assembly for the purpose of removing the roller 14 or replacing any of the parts is the reverse of the assembly procedure described above. The set-screw 46 and the spring 50 are first retracted from engagement with a spacer block 54. If the spacer block or the shaft 17 are not readily removed, any slender tool, such as a screwdriver, may be inserted in the aperture 25 to force the shaft downward.

Figs. 9–11 show a modification of my invention relating to the bearing for the lower end of the roller shaft, the parts of the construction that are unchanged being indicated by the same numerals as employed in the previous figures.

In this modification an inner bearing member 56 substituted for the inner bearing member 38 of the first described form of my invention differs from said member 38 in having its inner face 57 inclined for cooperation with a wedge member 58 that is inserted between the inner bearing member and the inner wall 59 of the recess 16. To hold the wedge member 58 in cooperative relation with the inner bearing member 56 and with freedom for the desired wedging action, a pair of screws 60 may be mounted on the inner face 57 in engagement with a suitable recessed slot 61 formed in the wedge member. In the normal assembled disposition of the parts the broader end 62 of the wedge member 58 is under pressure from an adjustment screw 63 extending inward from a suitable bore 64 in the reamer body 10. To keep the adjustment screw 63 from working loose, it may be engaged laterally by a small set screw 65 extending inward from a second bore 66.

The purpose of this modification is to arrange for snugness of fit in the bearing construction at the lower end of the roller shaft and to provide means adjustable to compensate for wear. When the parts are initially assembled, the screws 60 hold the wedge member 58 against the inner face 57 of the bearing member 56, so that if the roller shaft 17 is placed in its normal position the desired wedging action may be had by simply tightening the screw 63 and then locking the screw 63 by tightening the set-screw 65. It will be apparent that the wedging action tending to move the inner bearing member 56 outward will subject the lower end of the roller shaft 17 to pressure between the bearing face 67 of the bearing member 56 and the diametrically opposed bearing face 68 of the U-shaped block 33.

In effect, this construction provides a split bearing, the outer half being the block member 33 and the inner half being the bearing member 56, there being means provided to move one of the members towards the other to compensate for wear. It will be noted that a gap 70 indicated by dotted lines in Fig. 9 is initially provided between the opposed plane faces of the block 33 and the bearing member 56 to permit the required wear compensating movement outward of the bearing member. While this construction at the lower end of the roller shaft is not self-tightening, it does provide a convenient means for taking up wear and restoring snugness of fit whenever the reamer is withdrawn from the well. With continued use, the shaft-receiving aperture through the inner bearing member 56 will tend to wear out of round, but the inner bearing face 67 provided by that aperture will maintain its cylindrical configuration. Since working forces exerted against the shaft 17 by the reamer roller 14 are directed radially inward against the reamer body 10, there will ordinarily be no significant wearing away of the bearing face 68 presented by the U-shaped block 33.

While I have described my invention in specific detail for the purpose of disclosure, it will be apparent to those skilled in the art that the form chosen may be widely changed and modified without departing from the spirit of my inventive concept. I reserve the right to all such changes and modifications that properly come within the scope of my appended claims.

I claim as my invention:

1. In a device of the character described, a bearing for a shaft, said bearing comprising: a split journal box embracing one end of the shaft and adapted to be tightened by longitudinal movement of the shaft; rotary means frictionally engaging the shaft to cause rotation thereof; and cam means associated with the shaft operable by rotation thereof to move the shaft longitudinally in the direction to tighten said split journal box.

2. A device of the character described having in combination: a longitudinally movable shaft; a bearing for the shaft contractible in response to longitudinal movement of the shaft; means engaging the shaft to cause the shaft to move longitudinally when rotated, thereby to contract said bearing; and a rotary member mounted on the shaft to transmit rotation thereto by friction.

3. In a device of the character described, the combination of: a shaft; cam means cooperative with the shaft to move the shaft in one axial direction when the shaft is rotated in either direction; a contractible bearing embracing the shaft and operatively associated with the shaft to be contracted by movement of the shaft in said axial direction; and rotary means frictionally embracing the shaft and tending to turn the shaft, thereby to tighten said bearing.

4. In a device of the character described, the combination of: a shaft having an inclined face at one end; means engaging said inclined face to cause the shaft to move axially toward its opposite end when rotated in either direction; a contractible bearing engaging said opposite end of the shaft and adapted to contract in response to said axial movement of the shaft; and a rotary member frictionally mounted on the shaft tending to rotate the shaft.

5. In a device of the character described, the combination of: a roller shaft having an inclined surface; means engaged by said inclined surface to cause the shaft to move axially when rotated; a bearing for the shaft; a movable member included in said bearing and operatively associated with the shaft to be moved by axial movement thereof; means to wedge said member into increasingly tight fit with the shaft when said member is moved by the shaft; and a rotary member frictionally mounted on the shaft to rotate the shaft, thereby to tighten said bearing.

6. A device of the character described having in combination: a body; a shaft subjected to a load directed toward said body, said shaft having an inclined surface; means engaged by said inclined surface to cause the shaft to move axially when rotated; an outer bearing means mounted on the body to engage said shaft; a removable inner bearing means to cooperate with said outer bearing means, said inner bearing means being disposed to receive said load from the shaft, said inner bearing means being operatively associated with the shaft to be moved by axial movement of the shaft; means presenting an inclined surface to said inner bearing means to wedge the inner bearing means into increasingly tight fit against the shaft as the inner bearing means is moved by the shaft; and a rotary member frictionally engaging the shaft to cause rotation thereof.

7. A device of the character described having in combination: a body; a shaft subjected to a load directed toward said body, said shaft having an inclined surface; means engaged by said inclined surface to cause the shaft to move axially when rotated; an outer bearing means mounted on the body to engage said shaft; a removable inner bearing means to cooperate with said outer bearing means, said inner bearing means being disposed to receive said load from the shaft, said inner bearing means engaging the shaft so as to be moved by axial movement of the shaft; a removable means between said inner bearing means and the body to wedge said inner bearing means toward the shaft when the inner bearing means is moved by axial movement of the shaft; and rotary means frictionally embracing the shaft to cause rotation thereof as required.

8. A device of the character described having in combination: a body; a shaft having an inclined surface; two fixed outer bearing means mounted on the body in spaced relation to engage opposite ends of the shaft; non-rotatable means near one end of the shaft engaged by said inclined surface to cause the shaft to move axially toward its other end when rotated; two complementary inner bearing means cooperating respectively with said outer bearing means, the inner bearing means associated with said other end of the shaft being in engagement with the shaft to be moved into increasingly tight fit with the shaft by axial movement of the shaft; and rotary means mounted on the shaft in frictional engagement therewith to rotate the shaft.

9. A device of the character described having in combination: a shaft having an inclined surface; non-rotatable means associated with the body near one end of the shaft engageable by said inclined surface to cause the shaft to move axially toward the other end of the shaft when the shaft is rotated; a removable inner bearing means to cooperate with the outer bearing means associated with said one end of the shaft; a removable inner bearing means cooperative with the other fixed bearing means and engageable by said shaft to be moved by axial movement of the shaft, said means being adapted when so moved to tighten against the shaft; and a rotary member frictionally embracing the shaft to cause rotation thereof as required.

10. A device of the character described having in combination: a body; a shaft having an inclined face at one end; two fixed outer bearing means mounted on the body in spaced relation to engage opposite ends of the shaft, one of said means being open at the end away from the other of said means, there being sufficient space provided in the vicinity of said two bearing means to permit removal of the shaft; spacer means insertable at said open end of the fixed bearing means to restrict axial movement of the shaft and to cooperate with said inclined face to cause axial movement of the shaft in one direction when the shaft is rotated; a removable inner bearing means cooperative with the outer bearing means having said open end; a removable inner bearing means cooperative with the other outer bearing means, said latter inner bearing means engaging the end of the shaft to be moved by said axial movement thereof; means presenting an inclined surface to said latter inner bearing means to wedge said inner bearing means against the shaft when moved by axial movement of the shaft; and a rotary member mounted on the shaft in frictional engagement therewith.

11. In a reamer having a roller on a shaft, the combination with the shaft of a split bearing comprising: an outer fixed bearing member engaging one side of the shaft; an inner movable bearing member engaging an opposite side of the shaft; a wedge member cooperative with the inner bearing member to move said inner bearing member towards said outer bearing member for snugness of fit with said shaft; and means for driving said wedge and holding the wedge at a driven position.

12. In combination: a shaft; rotary means rotatably mounted on the shaft and tending through friction to rotate the shaft; clamping means for restraining said shaft from turning; means by which said clamping means is actuated to grip the shaft by a longitudinal or axial movement of said shaft; and means by which rotation of said shaft causes longitudinal or axial movement thereof.

13. In combination: a shaft; clamping means for restraining said shaft from turning; means by which said clamping means is actuated to grip the shaft by a longitudinal or axial movement of said shaft; and means by which any rotation of said shaft causes such a longitudinal or axial movement thereof.

14. In combination: a structure; a shaft carried in said structure; restraining means for holding said shaft and resisting any tendency of said shaft to rotate in either rotary direction in said structure, said resistance against rotation being increased by an axial movement of said shaft in one direction; and means by which any rotation of said shaft in either rotary direction causes such an axial movement of said shaft.

15. In combination: a structure; a shaft carried in said structure; restraining means for holding said shaft and resisting any tendency of said shaft to rotate in either rotary direction in said structure, said resistance against rotation being increased by an axial movement of said shaft in one direction; means by which any rotation of said shaft causes such an axial movement of said shaft; and means by which said resistance can be established prior to any turning of said shaft.

ERNEST KOPPL.